United States Patent
Sloss

(10) Patent No.: US 11,681,786 B2
(45) Date of Patent: Jun. 20, 2023

(54) SYSTEM, DEVICES AND/OR PROCESSES FOR SECURE COMPUTATION

(71) Applicant: Arm Limited, Cambridge (GB)

(72) Inventor: Andrew Neil Sloss, Kirkland, WA (US)

(73) Assignee: Arm Limited, Cambridge (GB)

(*) Notice: Subject to any disclaimer, the term of this patent is extended or adjusted under 35 U.S.C. 154(b) by 103 days.

(21) Appl. No.: 17/114,346

(22) Filed: Dec. 7, 2020

(65) Prior Publication Data
US 2022/0179928 A1    Jun. 9, 2022

(51) Int. Cl.
| G06F 8/41 | (2018.01) |
| G06F 1/12 | (2006.01) |
| G06F 21/14 | (2013.01) |
| G06F 9/455 | (2018.01) |
| G06F 21/54 | (2013.01) |
| G06F 21/79 | (2013.01) |

(52) U.S. Cl.
CPC ............ *G06F 21/14* (2013.01); *G06F 9/4552* (2013.01); *G06F 21/54* (2013.01); *G06F 21/79* (2013.01)

(58) Field of Classification Search
CPC ........ G06F 21/14; G06F 9/4552; G06F 21/54; G06F 21/79; G06F 8/41; G06F 21/125
See application file for complete search history.

(56) References Cited

U.S. PATENT DOCUMENTS

| 2015/0113250 A1* | 4/2015 | Henry ................ G06F 9/30145 712/208 |
| 2017/0091486 A1* | 3/2017 | Clarke .................... G06F 21/14 |
| 2017/0192760 A1* | 7/2017 | Bradbury .............. G06F 9/4552 |
| 2017/0371769 A1* | 12/2017 | Merten ............... G06F 11/3636 |

FOREIGN PATENT DOCUMENTS

| EP | 2863301 A1 * | 4/2015 | ............... G06F 9/26 |
| EP | 3549020 A1 * | 10/2019 | ......... G06F 11/3624 |
| GB | 2579072 A * | 6/2020 | ........... G06F 21/125 |

OTHER PUBLICATIONS

Notification of Transmittal of the International Search Report and the Written Opinion of the International Searching Authority, or Declaration, App. No. PCT/EP2021/025484, dated Mar. 17, 2022, 18 Pages.

Kollenda, et al, "An Exploratory Analysis of Microcode as a Building Block for System Defenses," ACM ISBN 978-1-4503-5693-0/18/10, Session 8D: BinDef 2, CCS '18, Oct. 15-19, 2018, 18 Pages.

* cited by examiner

*Primary Examiner* — Joseph P Hirl
*Assistant Examiner* — Aayush Aryal
(74) *Attorney, Agent, or Firm* — Berkeley Law & Technology Group, LLP

(57) ABSTRACT

Briefly, example methods, apparatuses, and/or articles of manufacture are disclosed that may be implemented, in whole or in part, using one or more processing devices to develop compilers and microcode for generation of runtime images for secure execution according to an instruction set architecture (ISA) on a computing device. For example, a co-development of a paired compiler and microcode may obscure how such a paired compiler and microcode are to express program instructions into binary runtime image.

15 Claims, 6 Drawing Sheets

SYSTEM, DEVICES AND/OR PROCESSES FOR SECURE COMPUTATION

BACKGROUND

1. Field

The present disclosure relates generally to implementation of computing resources available to provide secure computing resources for computing clients.

2. Information

Computing devices typically include processing circuitry capable of executing computing instructions according to an instruction set architecture (ISA). For example, instructions of a runtime image may be loaded to a memory at particular locations to be fetched and executed by processing circuitry to perform an intended computing task. Such a runtime image may be previously formed from an interpretation/compilation of instructions in a programming language. Such an interpretation/compilation of instructions may be performed off-line by a compiler.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
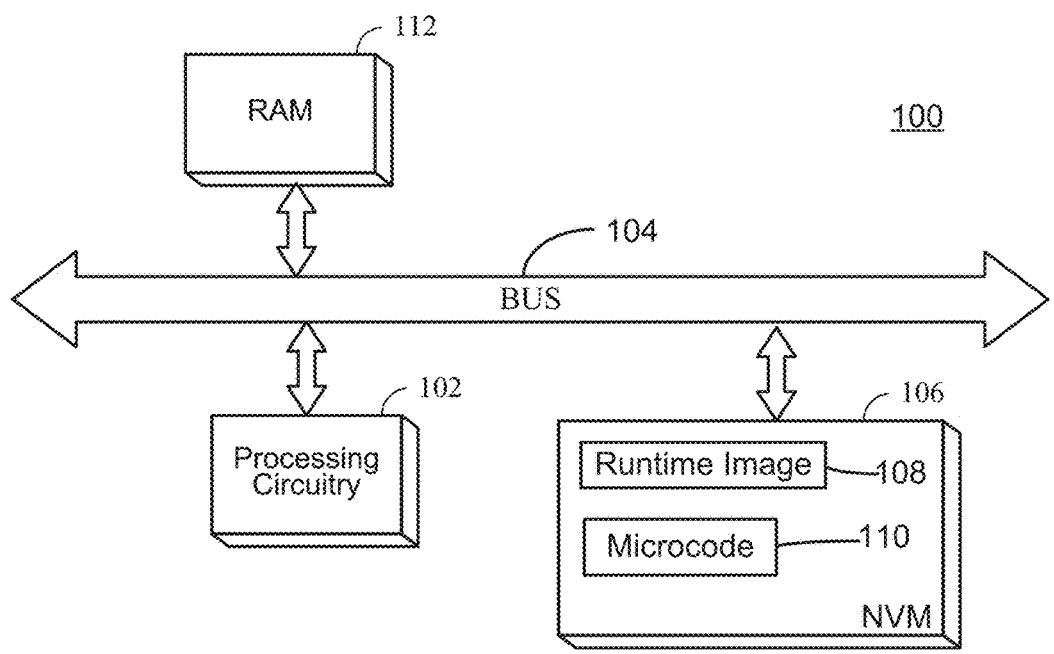
FIG. 1 is a schematic diagram of a computing device according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

According to an embodiment, processing circuitry of a computing device may execute a runtime image loaded to a memory to perform computing tasks. For example, such processing circuitry may be capable of executing particular instructions of such a runtime image according to an instruction set architecture (ISA). In an embodiment, such a runtime image may comprise instructions formatted according to a machine language interface (e.g., defining individual instructions/operation such as ADD, MUL, MOV, LDR, STR, BRA, RTN, CMP, ORR, NOT, AND, NOR, XOR as a series of "ones" and "zeros").

In an embodiment, aspects of such a computing device (e.g., for execution of runtime images) may be obtained using knowledge of such a machine language interface. In some implementations, a computing device may be vulnerable to unauthorized computer programs such as malware or spyware. Such an unauthorized computer program may comprise a runtime image that is formatted according to a machine-language interface supported by a microcode capable generating micro operations. Particular embodiments described herein are directed to a co-evolution of a compiler and microcode that obscures features of a machine-language interface and may prevent access to a computing device by unauthorized third parties.

FIG. 1 is a schematic diagram of a computing device 100 according to an embodiment. Processing circuitry 102, non-volatile memory (NVM) 106 and random access memory (RAM) 112 are coupled to bus 104. In one implementation, computing device 100 may be formed in a single integrated circuit (IC) die as a system on a chip (SoC) to be an embedded in a device to meet low-power and/or form factor objectives as in an Internet of Things (IoT) device. In another implementation, computing device 100 may include additional devices such as, for example, sensors, input/output devices, etc. (not shown).

According to an embodiment, processing circuitry 102 may comprise any one of several types of processing circuits having a capability of executing instructions formatted according to an ISA (e.g., according to any one of several reduced instruction set computer (RISC) (e.g., Intel® X86 instruction set) or complex instruction set computer (CISC) designs). For example, processing circuitry 102 may comprise logic and/or circuitry such as an arithmetic logic unit (ALU), registers and/or cache memory (not shown) to sequentially fetch instructions formatted according to the ISA stored in particular locations of RAM 112 (e.g., employing an execution pipeline). According to an embodiment, NVM 106 may store microcode 110 and runtime image 108. Responsive to an event (e.g., power-up or reset event) instructions of microcode 110 may be loaded to RAM 112 and executed by processing circuitry 102. Runtime image 108 may comprise instructions formatted in a machine language according to a machine language interface. In an embodiment, execution of microcode 110 may interpret instructions of runtime image 108 to generate micro operations. Such micro operations may be executable by processing circuitry 102 according to the ISA to perform an intended computing task.

Figure 2:
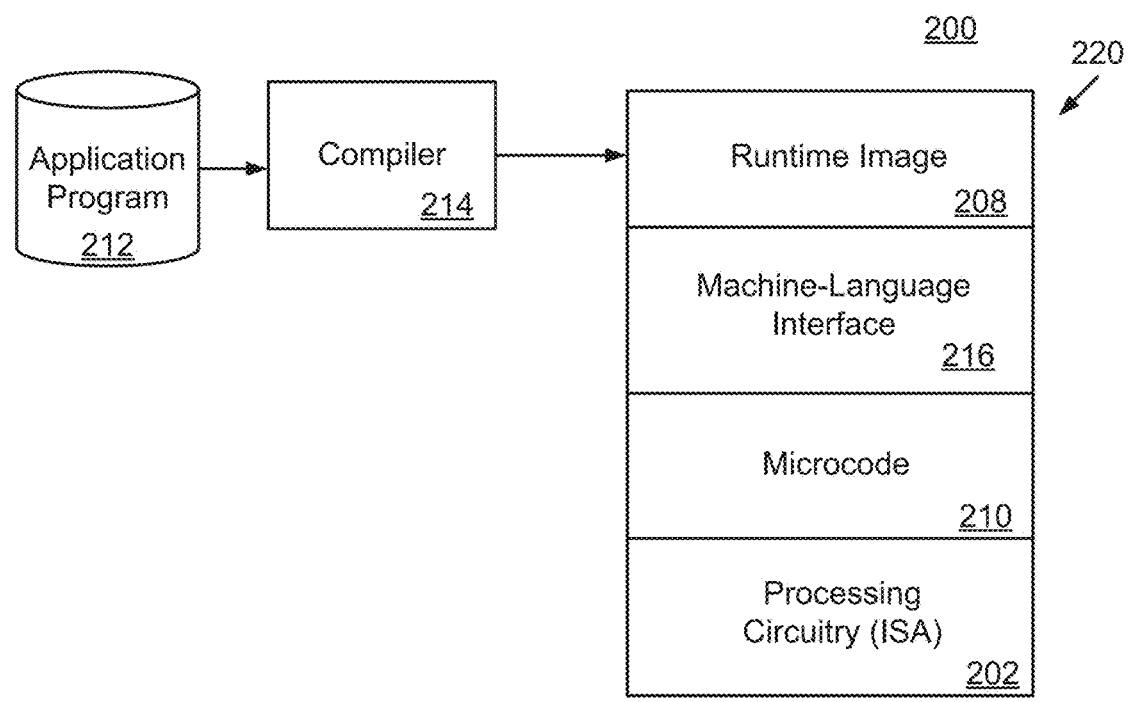
FIG. 2 is a flow diagram of a process to create a runtime image according to an embodiment.

FIG. 2 is a flow diagram of a process 200 to create a runtime image 208 (such as runtime image 108) according to an embodiment. An application program 212 may comprise program instructions formatted according to a programming language such as, for example, C, C++, Pascal, Ada, Rust, Go, and any other LLVM enabled language, just to provide a few example programming languages. A compiler 214 may comprise a program executable on a computing device (not shown) to interpret instructions of application program 212 to generate runtime image 208. As pointed out above, runtime image 208 may comprise instructions formatted according to a particular machine language such that individual instructions are expressed as a series of "ones" and "zeros."

According to an embodiment, a particular machine language to express runtime image 208 may at least in part define features of a machine-language interface 216. In an implementation, machine-language interface 216 define how microcode 210 is to interpret machine language instructions of runtime image 208 to generate micro operations that are executable by processing circuitry 202 according to an ISA. According to an embodiment, compiler 214 may translate programming language instructions into an assembly language instructions, and then translate assembly language instructions into a machine language according to an assembler. To assist a community of developers and/or customers, such an assembler may be published to reveal how assembly language instructions are to be translated into a machine language to provide runtime images. In some scenarios, however, public availability of such an assembler may enable unauthorized parties to access a computing device to, for example, cause the computing device to execute unauthorized programs (e.g., malware and/or spyware), or gain the ability to reverse engineering to obtain confidential information.

According to an embodiment, a fluidly changing machine-language interface may prevent some types of unauthorized access to a computing device such as computing device 100. In a particular implementation, compiler 214 and microcode 210 may be reconstituted from time to time to obscure details of machine-language interface 216. According to an embodiment, compiler 214 and microcode 210 may co-evolve to modify and/or obscure machine-language interface 216. In an implementation, such changes to machine-language interface 216 may make is significantly difficult for parties to access a computing device to, for example, cause execution of unauthorized runtime images.

Figure 3A:
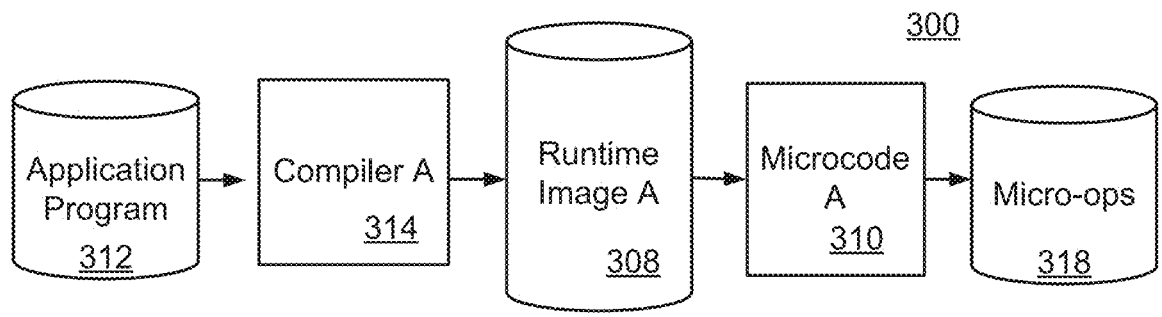
FIGS. 3A and 3B are flow diagrams illustrating transformations of an application program to micro operations according to an embodiment.
Figure 3B:
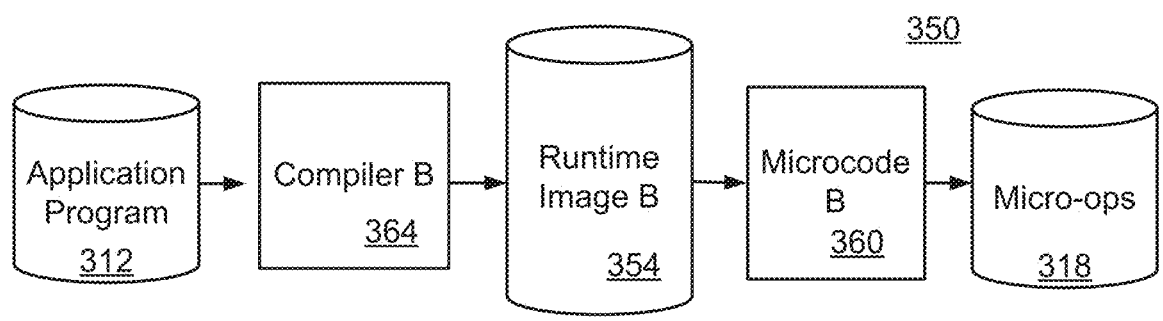

FIGS. 3A and 3B are flow diagrams illustrating transformations of an application program 312 to micro-operations 318 according to an embodiment. As indicated above, application program 312 may comprise instructions expressed in any one of several programming languages. Also, micro-operations 318 may comprise instructions which are executable by processing circuitry (e.g., processing circuitry 102) according to an ISA. As shown in FIG. 3A, first compiler 314 may interpret instructions of application program 312 to provide runtime image 308 comprising instructions formatted in a first machine language according to a first machine-language interface. Interpreting instructions of runtime image 308 according to the first machine-language interface, first microcode image 310 may generate micro operations 318.

According to an embodiment of a transformation as shown in FIG. 3B, first compiler 314 may be replaced with second compiler 364 and microcode 310 may be replaced with second microcode 360 to define a second machine-language interface. In a particular implantation, second compiler 364 and second microcode 360 may comprise modifications of first compiler 314 and first microcode 310, respectively. Alternatively, second compiler 364 and second microcode 360 may comprise complete configurations of first compiler 314 and first microcode 310, respectively. In an implementation, by defining a second machine-language interface via second compiler 364 and second microcode 360, a runtime image to be compatible with the first machine-language interface may not be interpretable to generate micro-operations that are executable according to an ISA.

Figure 4:
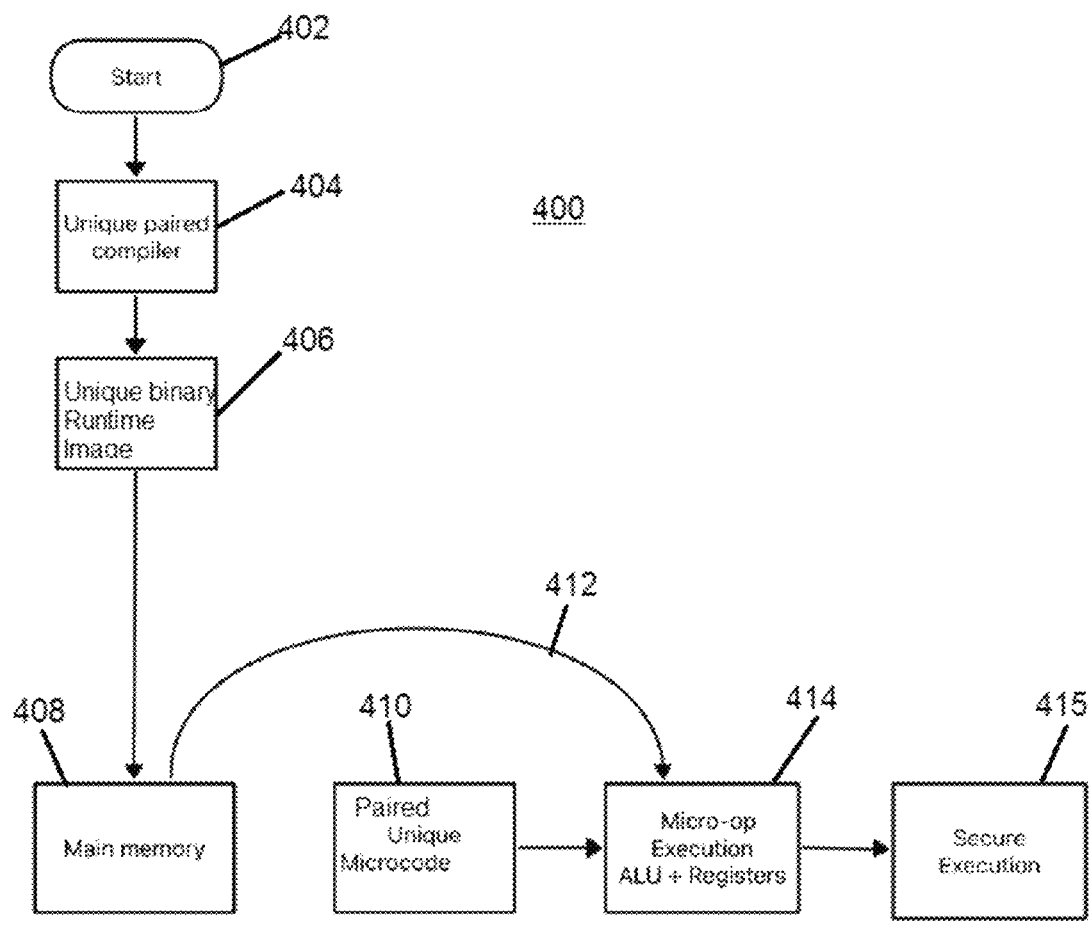
FIG. 4 is a flow diagram of a process to create and load an executable image to a computing device according to an embodiment.

FIG. 4 is a flow diagram of a process 400 to create and load an executable image to a computing device according to an embodiment. Blocks 404 and 406 may be executed in a development environment in which unique paired compiler 404 is executed to generate a unique binary runtime image 406 to be stored in a main memory 408 (e.g., RAM 112, FIG. 1) of a computing device. As pointed out above, unique paired compiler 404 may generate unique binary runtime image 406 based, at least in part, on instructions formatted according to a programming language. In an implementation, unique binary runtime image 406 may comprise an executable image encoded in "ones" and "zeros." At execution of unique binary runtime image loaded to main memory 408, paired unique microcode 410 (e.g., residing in an NVM such as NVM 106) may be fetched and executed by an arithmetic logic unit (ALU) and registers of processing circuitry 414 (e.g., processing circuitry 102)) to generate micro operations based, at least in part, on encoded instructions of unique binary runtime image 406 fetched from main memory 408.

According to an embodiment, unique paired compiler 404 and unique paired microcode 410 may co-evolve to modify and/or obscure a relationship between unique paired compiler 404 and unique paired microcode 410 that defines how programming (and/or assembly) language instructions are to be translated/encoded into ones and zeros of a unique binary runtime image (e.g., machine-language interface 216). Such a fluidity in a definition of how programming (and/or assembly) language instructions are to be translated/encoded into ones and zeros of a unique binary runtime image 406 may create a significant barrier to execution of unauthorized executable images (e.g., malware and/or spyware) through paired unique micro code 410, enabling secure execution 415. That is, without knowledge of unique machine-language interface mapping instructions to a binary runtime image, an authorized party may be incapable of installing malware and/or spyware to be transformed into micro operations by microcode and executed.

Figure 5:
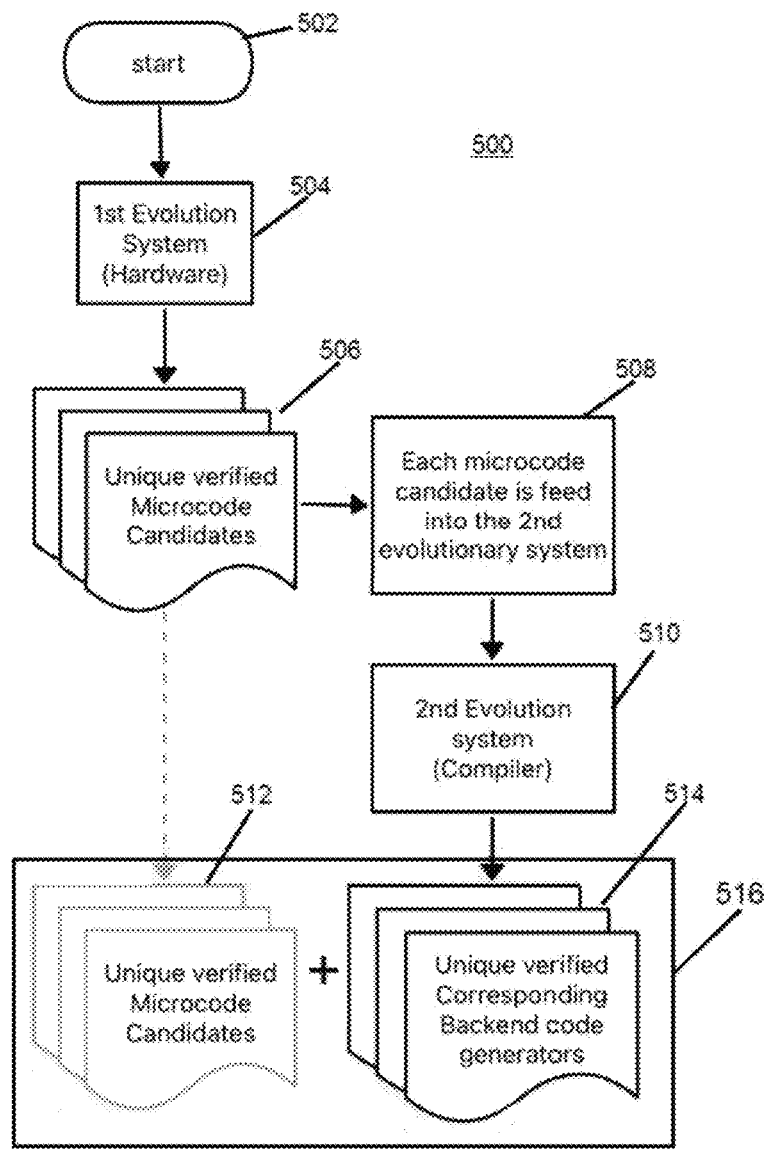
FIG. 5 is a flow diagram of a process for co-evolution of a paired microcode image and compiler, according to an embodiment.

FIG. 5 is a flow diagram of a process for co-evolution of a paired microcode and compiler such as unique paired compiler 404 and paired unique microcode 410 (FIG. 4), according to an embodiment. According to an embodiment, items 502 through 510 may at least in part define a pairing 516 of a selected unique verified microcode candidate 512 and a unique verified corresponding backend code generator 514 enabling a secure execution environment that prevents execution of unauthorized runtime images. At block 504, elements of a hardware environment may be defined such as, for example, an ISA that is to be expressed in processing circuitry (e.g., processing circuitry 102).

Based, at least in part, on such defined elements of a hardware environment, multiple verified microcode candidates 506 may be generated to, for example, define how instructions expressed in a binary form (e.g., instructions of a runtime) are to be translated into micro operations (e.g., for execution according to an ISA defined in block 504). In an embodiment, an individual unique verified microcode candidate 512 and a corresponding, co-developed unique verified backend code generator 514 may define a unique machine-language interface According to an embodiment, different versions of compiler may be determined based on corresponding individual unique verified micro code candidates 506. Here, an individual unique verified corresponding backend code generator 514 (e.g., capable of generating runtime images based on programming language instructions) may be generated by an evolution system 510 based on a corresponding unique verified microcode candidate 506 selected at block 508.

According to an embodiment, different multiple verified microcode candidates 506 may define different and/or unique such translations of binary instructions of a runtime image to micro operations. For example, different transformations and/or mappings of binary instructions into micro operations (e.g., at blocks 504 and 510) may be produced by application of one or more mathematical functions such as scrambling and/or encoding functions to successively generate transformations and/or mappings. In a particular implementation, such successively generated transformations and/or mappings may be iteratively generated (e.g., at blocks 504 and 510) according to expressions (1), (2) and/or (3) as follows:

$$MC_1[I_1, I_2, \ldots, I_n] \rightarrow [B_{1,1}, B_{2,1}, \ldots, B_{n,1}] \quad (1)$$

$$MC_2[I_1, I_2, \ldots, I_n] \rightarrow f_1\{[B_{1,1}, B_{2,1}, \ldots, B_{n,1}]\} = [B_{1,2}, B_{2,2}, \ldots, B_{n,2}] \quad (2)$$

$$MC_k[I_1, I_2, \ldots, I_n] \rightarrow f_{k-1}\{[B_{1,k-1}, B_{2,k-1}, \ldots, B_{n,k-1}]\} = [B_{1,k}, B_{2,k}, \ldots, B_{n,k}] \quad (3)$$

where:
- $[I_1, I_2, \ldots, I_n]$ is a vector representing instructions of an ISA expressed in hardware such as a processing circuit;
- $MC_m$ is a transformation of binary expressions instructions in a runtime image into micro operations for execution by instructions represented by $[I_1, I_2, \ldots, I_n]$;
- $f_m$ is a function to be applied to binary encodings of instructions to be transformed into micro operations; and
- $[B_{1,m}, B_{1,m}, \ldots, B_{n,m}]$ is a vector representing binary expressions of respective instructions (e.g., generated by a compiler) to be transformed to micro operations by candidate microcode iteration $MC_m$ for execution instructions of $[I_1, I_2, \ldots, I_n]$ by a candidate microcode iteration $MC_m$.

In a particular implementation, $f_m$ may comprise an encoding and/or scrambling function to be applied to individual binary encodings of instructions $[B_{1,m}, B_{1,m}, \ldots, B_{n,m}]$ to generate binary encodings, $[B_{1,m+1}, B_{1,m+1}, \ldots, B_{n,m+1}]$. It should be understood, however, that this is merely an example of how successive binary encodings of instructions may be mapped, and that claimed subject matter is not limited in this respect.

Figure 6:
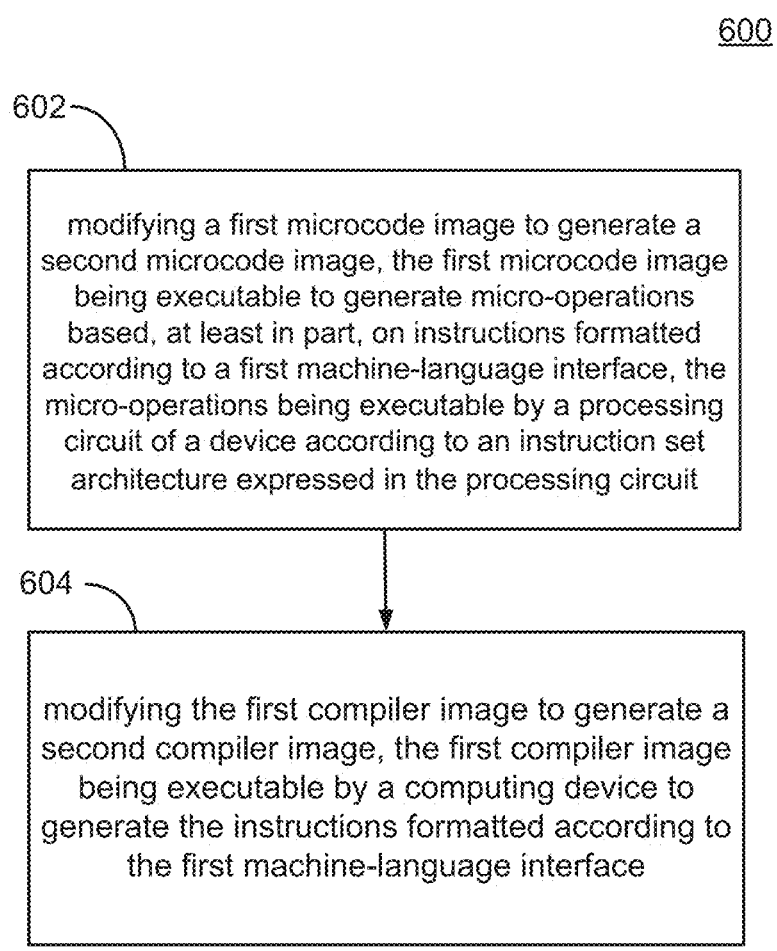
FIG. 6 is a flow diagram of a process for co-evolution of a paired microcode image and compiler, according to an embodiment.

FIG. 6 is a flow diagram of a process for generating paired micro code images and compilers for capable of generating micro operations for execution according to an ISA based on programming language instructions according to an embodiment. Block 602 may comprise modification of a first microcode image (e.g., microcode A 310 or a first unique verified microcode candidate 506) to generate a second microcode image (e.g., microcode B 360 or a second unique verified microcode candidate 506) based, at least in part, on some mapping or translation. In this context, a "microcode image" as referred to herein comprises instructions that, if executed, are capable of generating micro operations (e.g., micro operations 318) based, at least in part, on binary encoded machine-language instructions. Such micro operations may be executable by a processing circuit according to an ISA to perform computing tasks. Additionally, block 602 may modify a first microcode image to provide a second microcode image so that the second microcode image translates runtime/machine language instructions according to a different transformation and/or mapping. For example, while such a first microcode image may translate binary encoded machine-language instructions $[B_{1,1}, B_{2,1}, \ldots, B_{n,1}]$ to micro operations according to instructions $[I_1, I_2, \ldots, I_n]$ of an ISA, a second (modified) microcode image may translate binary encoded machine-language instructions $[B_{1,m}, B_{2,m}, \ldots, B_{n,m}]$ instead according to expressions (1), (2) and/or (3).

Block 604 may comprise modifying a first compiler image (e.g., compiler A 314 or first compiler 514) to provide a second compiler image (e.g., compiler A 314 or first compiler 514). In this context, a "compiler image" as referred to herein means instructions that are executable by a computing device to generate a binary encoded runtime image. In an embodiment, such a binary encoded runtime image may define how binary encoded operations are to be interpreted for execution by an ISA according to a machine-language interface. In this context, a "machine-language interface" as referred to herein means a particular mapping of binary encoded instructions of a runtime image (e.g., as determined by a compiler) to micro operations (e.g., to be generated by an executed microcode image). While a first compiler may be defined according to a first machine-language interface (e.g., to generate micro operations for ISA instructions $[I_1, I_2, \ldots, I_n]$ from binary encoded machine-language instructions $[B_{1,1}, B_{2,1}, \ldots, B_{n,1}]$), block 604 may determine a second compiler according to a second machine-language interface (e.g., to generate micro operations for ISA instructions $[I_1, I_2, \ldots, I_n]$ from binary encoded machine-language instructions $[B_{1,m}, B_{2,m}, \ldots, B_{n,m}]$). By altering a machine-language interface (e.g., implementing a modified second microcode image determined at block 602 and a matched modified second complier determined at block 604), a device may be inaccessible to execute machine-language instructions interface, machine-language instructions that are not generated from a most recent second compiler image paired with a most recent microcode image.

According to an embodiment, a second microcode image determined at block 602 may be stored in an NVM of a computing device (e.g., NVM 106 of computing device 100, FIG. 1) to replace a first microcode image stored on the NVM. In a particular implementation, such an NVM of a computing device may be accessed to store an updated microcode image (e.g., on a schedule of firmware updates) to replace a previously stored microcode image. Runtime images (e.g., expressing instructions in a first machine-language interface) stored in the NVM may be similarly replaced by runtime images (e.g., expressing instructions in a second, different machine-language interface) generated from execution of an updated compiler matched with the updated microcode image. While such updated microcode may generate micro operations to execute such an updated runtime image, unauthorized instructions (e.g., formatted according to the first machine-language interface) may not be executable since the updated microcode may not be capable of generating micro operations from the unauthorized instructions.

In the context of the present patent application, the term "connection," the term "component" and/or similar terms are intended to be physical but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present patent application, the terms "entry," "electronic entry," "document," "electronic document," "content", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term "parameters" (e.g., one or more parameters), "values" (e.g., one or more values), "symbols" (e.g., one or more symbols) "bits" (e.g., one or more bits), "elements" (e.g., one or more elements), "characters" (e.g., one or more characters), "numbers" (e.g., one or more numbers), "numerals" (e.g., one or more numerals) or "measurements" (e.g., one or more measurements) refer to material descriptive of a collection of signals, such as in one or more electronic documents and/or electronic files, and exist in the form of physical signals and/or physical states, such as memory states. For example, one or more parameters, values, symbols, bits, elements, characters, numbers, numerals or measurements, such as referring to one or more aspects of an electronic document and/or an electronic file comprising an image, may include, as examples, time of day at which an image was captured, latitude and longitude of an image capture device, such as a camera, for example, etc. In another example, one or more parameters, values, symbols, bits, elements, characters, numbers, numerals or measurements, relevant to digital content, such as digital content comprising a technical article, as an example, may include one or more authors, for example. Claimed subject matter is intended to embrace meaningful, descriptive parameters, values, symbols, bits, elements, characters, numbers, numerals or measurements in any format, so long as the one or more parameters, values, symbols, bits, elements, characters, numbers, numerals or measurements comprise physical signals and/or states, which may include, as parameter, value, symbol bits, elements, characters, numbers, numerals or measurements examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public. According to an embodiment, a signal packet and/or frame may comprise all or a portion of a "message" transmitted between devices. In an implementation, a message may comprise signals and/or states expressing content to be delivered to a recipient device. For example, a message may at least in part comprise a physical signal in a transmission medium that is modulated by content that is to be stored in a non-transitory storage medium at a recipient device, and subsequently processed.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

Figure 7:
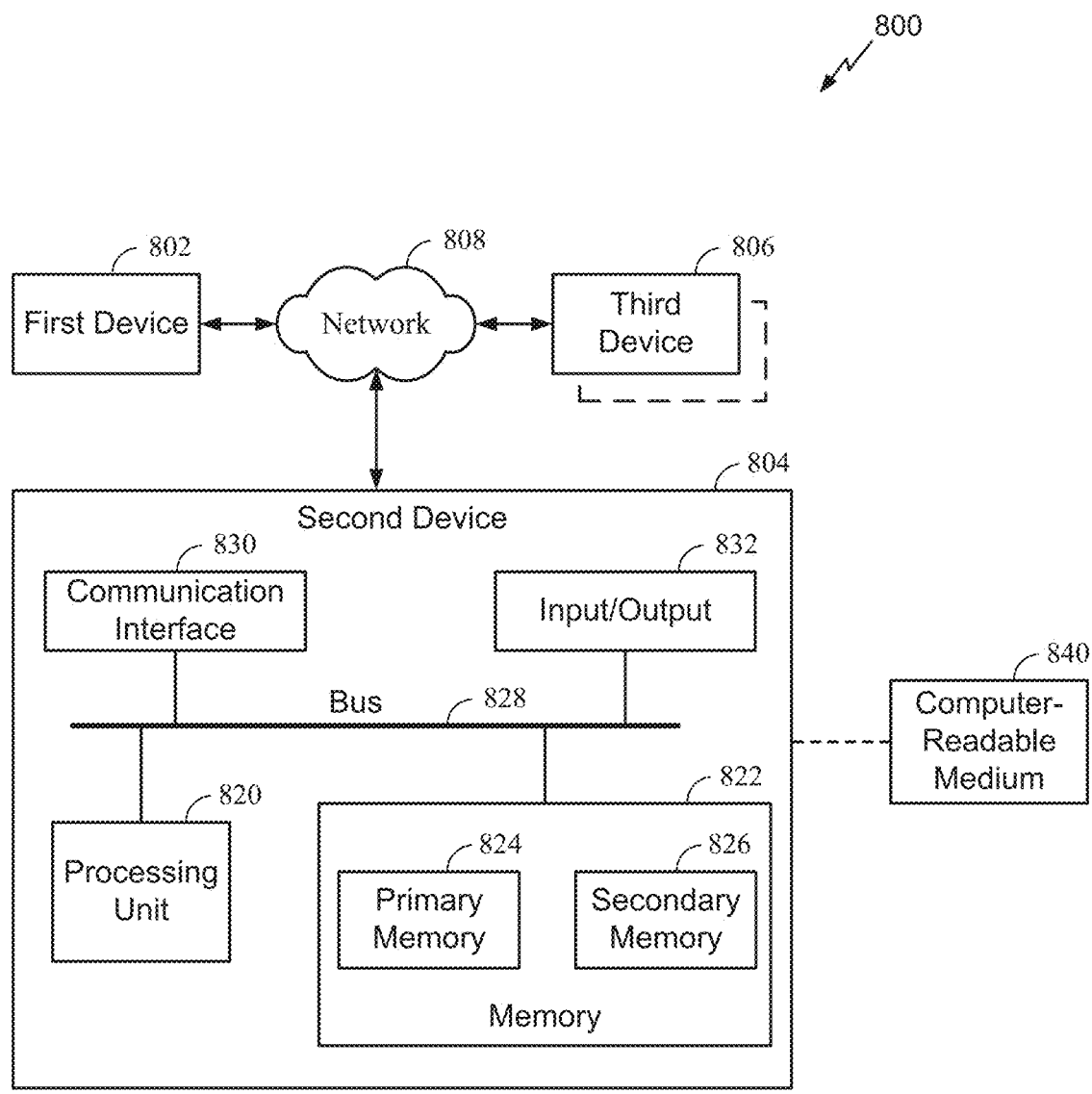
FIG. 7 is a schematic block diagram of an example computing system in accordance with an implementation.

In one example embodiment, as shown in FIG. 7, a system embodiment may comprise a local network (e.g., device 804 and medium 840) and/or another type of network, such as a computing and/or communications network. For purposes of illustration, therefore, FIG. 7 shows an embodiment 800 of a system that may be employed to implement either type or both types of networks. Network 808 may comprise one or more network connections, links, processes, services, applications, and/or resources to facilitate and/or support communications, such as an exchange of communication signals, for example, between a computing device, such as 802, and another computing device, such as 806, which may, for example, comprise one or more client computing devices and/or one or more server computing device. By way of example, but not limitation, network 808 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 7 may comprise features, for example, of a client computing device and/or a server computing device, in an embodiment. It is further noted that the term computing device, in general, whether employed as a client and/or as a server, or otherwise, refers at least to a processor and a memory connected by a communication bus. A "processor" and/or "processing circuit" for example, is understood to connote a specific structure such as a central processing unit (CPU) of a computing device which may include a control unit and an execution unit. In an aspect, a processor and/or processing circuit may comprise a device that fetches, interprets and executes instructions to process input signals to provide output signals. As such, in the context of the present patent application at least, this is understood to refer to sufficient structure within the meaning of 35 USC § 112 (f) so that it is specifically intended that 35 USC § 112 (f) not be implicated by use of the term "computing device" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIG. 1 through FIG. 6 in the text associated with the foregoing figure(s) of the present patent application.

Referring now to FIG. 7, in an embodiment, first and third devices 802 and 806 may be capable of rendering a graphical user interface (GUI) for a network device and/or a computing device, for example, so that a user-operator may engage in system use. Device 804 may potentially serve a similar function in this illustration. Likewise, in FIG. 7, computing device 802 ('first device' in figure) may interface with computing device 804 ('second device' in figure), which may, for example, also comprise features of a client computing device and/or a server computing device, in an embodiment. Processor (e.g., processing device) 820 and memory 822, which may comprise primary memory 824 and secondary memory 826, may communicate by way of a communication bus 815, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 804, as depicted in FIG. 7, is merely one example, and claimed subject matter is not limited in scope to this particular example. FIG. 7 may further comprise a communication interface 830 which may comprise circuitry and/or devices to facilitate transmission of messages between second device 804 and first device 802 and/or third device 806 in a physical transmission medium over network 808 using one or more network communication techniques identified herein, for example. In a particular implementation, communication interface 830 may comprise a transmitter device including devices and/or circuitry to modulate a physical signal in physical transmission medium according to a particular communication format based, at least in part, on a message that is intended for receipt by one or more recipient devices. Similarly, communication interface 830 may comprise a receiver device comprising devices and/or circuitry demodulate a physical signal in a physical transmission medium to, at least in part, recover at least a portion of a message used to modulate the physical signal according to a particular communication format. In a particular implementation, communication interface may comprise a transceiver device having circuitry to implement a receiver device and transmitter device.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 5D or 3D display, for example.

In FIG. 7, computing device 802 may provide one or more sources of executable computer instructions in the form physical states and/or signals (e.g., stored in memory states), for example. Computing device 802 may communicate with computing device 804 by way of a network connection, such as via network 808, for example. As previously mentioned, a connection, while physical, may not necessarily be tangible. Although computing device 804 of FIG. 7 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 822 may comprise any non-transitory storage mechanism. Memory 822 may comprise, for example, primary memory 824 and secondary memory 826, additional memory circuits, mechanisms, or combinations thereof may be used. Memory 822 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 822 may be utilized to store a program of executable computer instructions. For example, processor 820 may fetch executable instructions from memory and proceed to execute the fetched instructions. Memory 822 may also comprise a memory controller for accessing device readable-medium 840 that may carry and/or make accessible digital content, which may include code, and/or instructions, for example, executable by processor 820 and/or some other device, such as a controller, as one example, capable of executing computer instructions, for example. Under direction of processor 820, a non-transitory memory, such as memory cells storing physical states (e.g., memory states), comprising, for example, a program of executable computer instructions, may be executed by processor 820 and able to generate signals to be communicated via a network, for example, as previously described. Generated signals may also be stored in memory, also previously suggested.

Memory 822 may store electronic files and/or electronic documents, such as relating to one or more users, and may also comprise a computer-readable medium that may carry and/or make accessible content, including code and/or instructions, for example, executable by processor 820 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 7, processor 820 may comprise one or more circuits, such as digital circuits, to perform at least a portion of a computing procedure and/or process. By way of example, but not limitation, processor 820 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 820 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 7 also illustrates device 804 as including a component 832 operable with input/output devices, for example, so that signals and/or states may be appropriately communicated between devices, such as device 804 and an input device and/or device 804 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method comprising:
modifying a first compiler image to generate a second compiler image such that binary expressions of instructions of a first runtime image generated from application of the first compiler image to programming-language instructions map to binary expressions of a second runtime image generated from application of the second compiler image to the programming-language instructions according to a transformation; and
modifying a first microcode image, the first microcode image being executable to generate micro-operations according to a first machine-language interface based, at least in part, on the first runtime image, to generate a second compiler microcode image based, at least in part, on the second runtime image, the first microcode image being executable by a processing circuit of one or more target devices according to an instruction set architecture expressed in the processing circuit, wherein the second microcode image and the second compiler image to impart a second machine-language interface such that:
the one or more target devices are inaccessible to execute machine-language instructions formatted according to the first machine-language interface through the second machine-language interface.

2. The method of claim 1, wherein the programming-language instructions are formatted according to an application programming interface (API).

3. The method of claim 1, wherein the first microcode image is stored in a non-volatile memory of at least one of the one or more target devices, the method further comprising:
storing the second microcode image in the non-volatile memory of the at least one of the one or more target devices to replace the first microcode image.

4. The method of claim 1, wherein the first machine-language interface comprises a first mapping of instructions to corresponding first binary expressions, and wherein the second machine-language interface comprises a second mapping of the instructions to corresponding second binary expressions.

5. The method of claim 1, wherein the transformation comprises an encoding and/or scrambling operation.

6. A method comprising:
accessing a non-volatile memory of a computing device to store a second microcode image to replace a first microcode image,
wherein:
the first microcode image is executable by a processing circuit of the computing device according to an instruction set architecture expressed in the processing circuit to generate micro-operations based, at least in part, on one or more first runtime images formatted according to a first machine-language interface, the one or more first runtime images to be generated by application of a first compiler image to an application program formatted according to a programming language;
the second microcode image is executable by the processing circuit of the computing device according to the instruction set architecture to generate micro-operations based, at least in part, on one or more second runtime images formatted according to a second machine-language interface, the one or more second runtime images to be generated by application of a second compiler image to the application program formatted according to the programming language;
the second compiler image is created based on the second compiler image such that binary expressions of instructions of the one or more first runtime images map to binary expressions of the one or more second runtime images according to a transformation; and
the computing device is inaccessible to execute machine-language instructions according to the first machine-language interface through the second machine-language interface.

7. The method of claim 6, wherein:
the first compiler image is co-developed with the first microcode image; and
the second compiler image is co-developed with the second microcode image.

8. The method of claim 6, wherein the first machine-language interface comprises a first mapping of instructions to corresponding first binary expressions, and wherein the second machine-language interface comprises a second mapping of the instructions to corresponding second binary expressions.

9. The method of claim 6, and wherein the transformation comprises an encoding and/or scrambling operation.

10. A computing device comprising:
one or more non-volatile memory devices;
a processing circuit, the processing circuit to comprise an instruction set architecture (ISA) expressed therein; and
one or more processors to:
access the one or more non-volatile memory devices to store a second microcode image to replace a first microcode image,
wherein:
the first microcode image to be executable by the processing circuit according to the ISA to generate micro-operations based, at least in part, on first runtime images formatted according to a first machine-language interface;
the second microcode image to be executable by the processing circuit according to the ISA to generate micro-operations based, at least in part, on second runtime images formatted according to a second machine-language interface;
the computing device is inaccessible to execute machine-language instructions according to the first machine-language interface through the second machine-language interface;
at least one of the first runtime images to be generated by a first compiler to be co-developed with the first microcode image;
at least one of the second runtime images to be generated by a second compiler to be co-developed with the second microcode image; and
the second compiler is based, at least in part, on the first compiler such that respective binary instructions of the at least one of the first runtime images map to respective binary instructions of the at least one of the second runtime images according to a transformation.

11. The computing device of claim 10, wherein the first machine-language interface to comprise a first mapping of instructions to corresponding first binary expressions, and wherein the second machine-language interface to comprise a second mapping of the instructions to corresponding second binary expressions.

12. The computing device of claim 10, and wherein the transformation comprises an encoding and/or scrambling operation.

13. An article comprising:
a storage medium comprising processor-readable instructions stored thereon, the processor-readable instructions to be executable by one or more processors to:
access a non-volatile memory of a computing device to store a second microcode image to replace a first microcode image,
wherein:
the first microcode image to be executable by a processing circuit of the computing device according to an instruction set architecture expressed in the processing circuit to generate micro-operations based, at least in part, on first runtime images formatted according to a first machine-language interface;
the second microcode image to be executable by the processing circuit of the computing device according to the instruction set architecture to generate micro-operations based, at least in part, on second runtime images formatted according to a second machine-language interface;
the computing device to be inaccessible to execute machine-language instructions according to the first machine-language interface through the second machine-language interface;
at least one of the first runtime images to be generated by a first compiler to be co-developed with the first microcode image;
at least one of the second runtime images to be generated by a second compiler to be co-developed with the second microcode image; and
the second compiler is based, at least in part, on the first compiler such that respective binary instructions of the at least one of the first runtime images map to respective binary instructions of the at least one of the second runtime images according to a transformation.

14. The article of claim 13, wherein the first machine-language interface to comprise a first mapping of instructions to corresponding first binary expressions, and wherein the second machine-language interface to comprise a second mapping of the instructions to corresponding second binary expressions.

15. The article of claim 13, and wherein the transformation comprises an encoding and/or scrambling operation.

* * * * *